United States Patent [19]
Simon

[11] Patent Number: 6,045,250
[45] Date of Patent: Apr. 4, 2000

[54] METHOD AND APPARATUS OF CONTROLLING BEAM DIVERGENCE AND DIRECTIONALITY

[76] Inventor: Jerome H. Simon, P.O. Box 67342, Chestnut Hill, Mass. 02167

[21] Appl. No.: 08/610,303

[22] Filed: Mar. 4, 1996

[51] Int. Cl.7 .................................................. F21V 13/06
[52] U.S. Cl. ...................... 362/576; 362/148; 362/268; 362/282; 362/322
[58] Field of Search .................................. 362/187, 268, 362/282, 322, 551, 552, 576, 147, 148

[56] References Cited

U.S. PATENT DOCUMENTS

| | | | |
|---|---|---|---|
| 3,594,566 | 7/1971 | Kneisley | 362/268 |
| 4,428,031 | 1/1984 | Mori | 362/576 |
| 4,890,208 | 12/1989 | Izenour | 362/268 |
| 4,994,946 | 2/1991 | NakaMats | 362/282 |
| 5,046,805 | 9/1991 | Simon | 385/31 |
| 5,050,047 | 9/1991 | Viner et al. | 362/552 |
| 5,130,908 | 7/1992 | Simon | 362/150 |

*Primary Examiner*—Alan Cariaso
*Attorney, Agent, or Firm*—Perkins, Smith & Cohen, LLP; Jerry Cohen; Harvey Kaye

[57] ABSTRACT

A system for controlling the divergence and directionality of a beam of electromagnetic radiation having a source of electromagnetic radiation for producing the beam, a conveying mechanism for conveying the beam in a preselected direction, and wherein the source of electromagnetic radiation is positioned proximate one end of the conveying mechanism. At the other end of the conveying mechanism is a distribution component for distributing the beam therefrom. The distribution component has a reflective element for receiving the beam from the conveying mechanism and directing the beam with at least one preselected divergence to a plurality of different locations. In addition, the conveying mechanism and the distribution component can also affect the divergence of the beam being output therefrom.

20 Claims, 6 Drawing Sheets

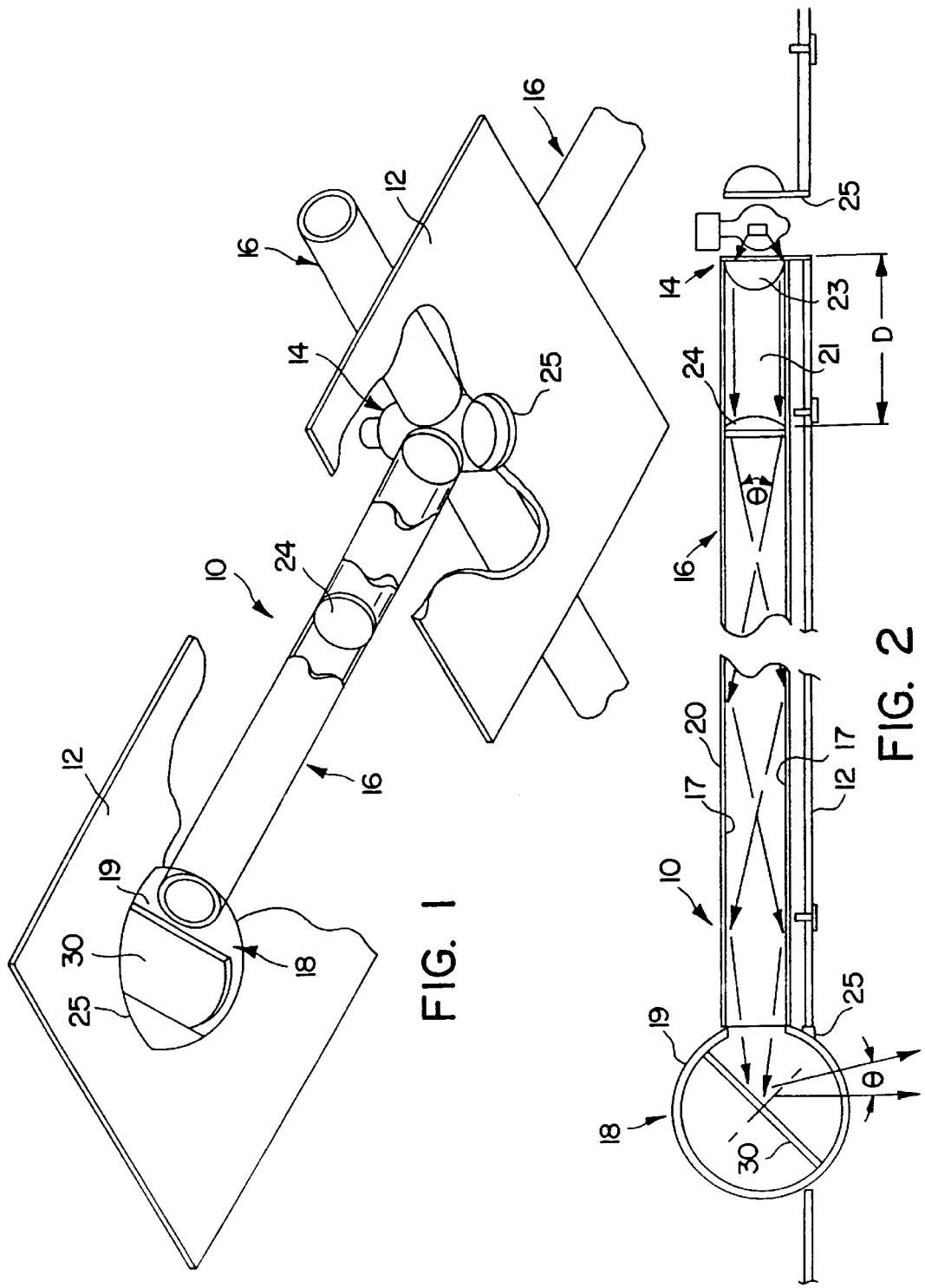

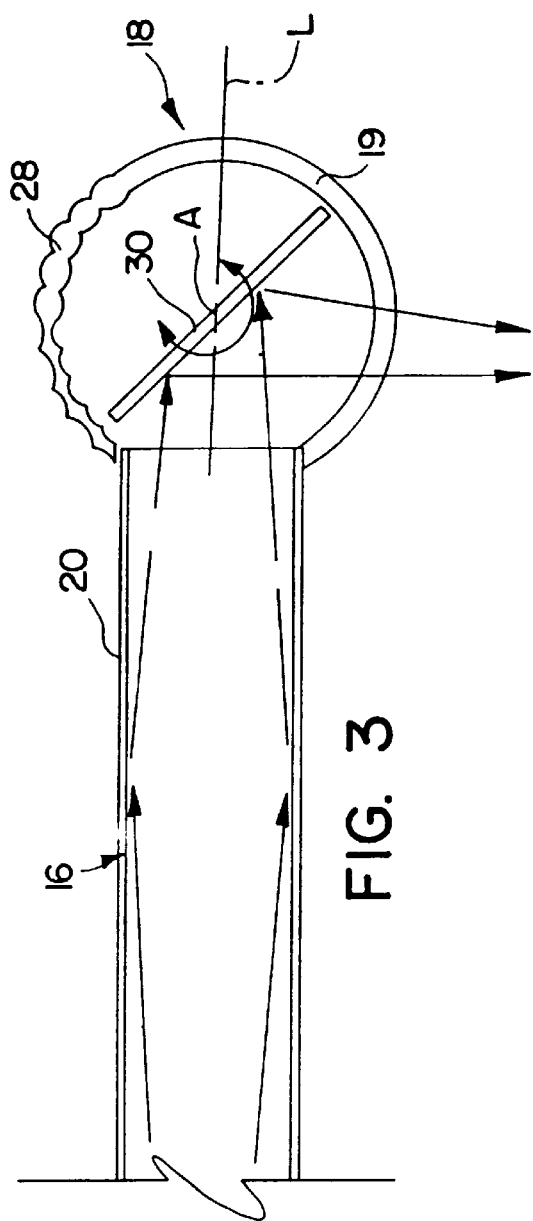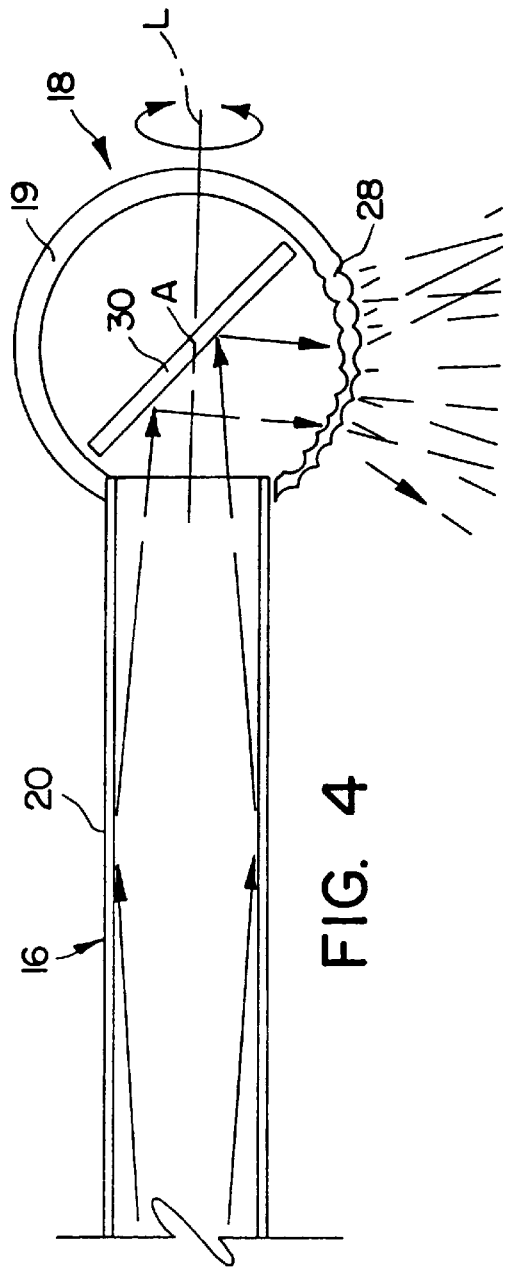

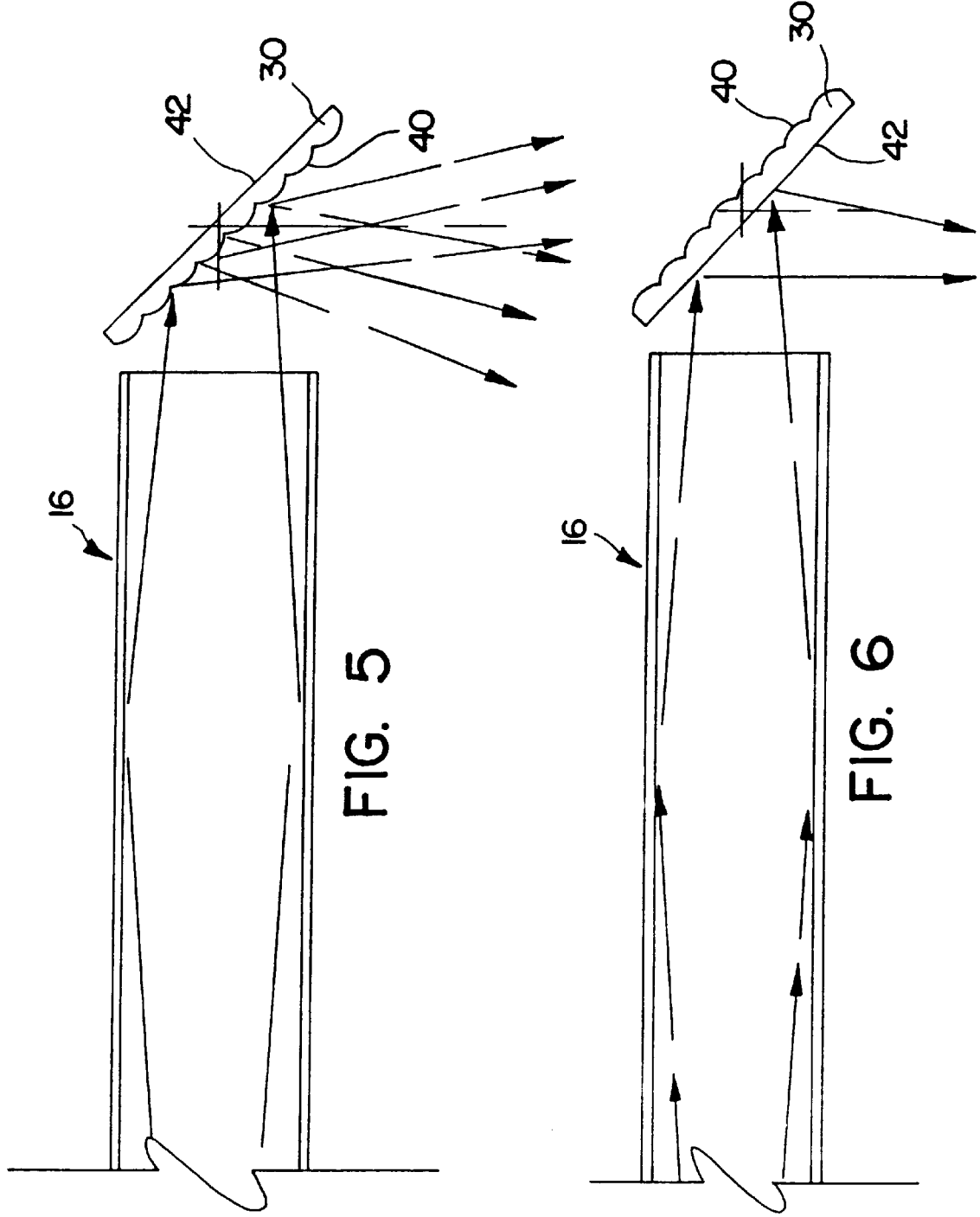

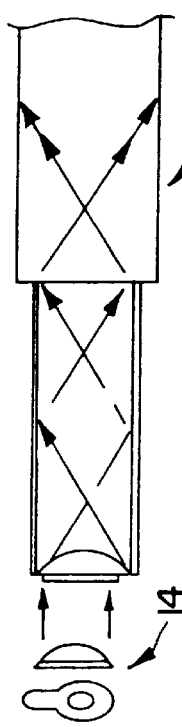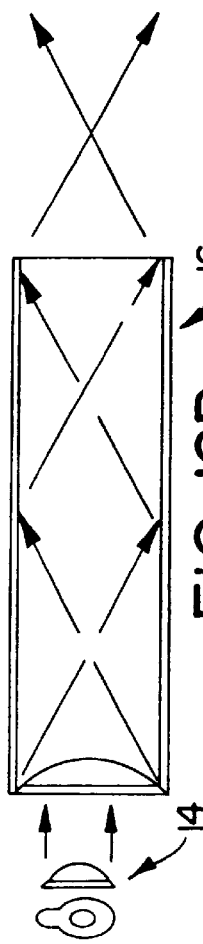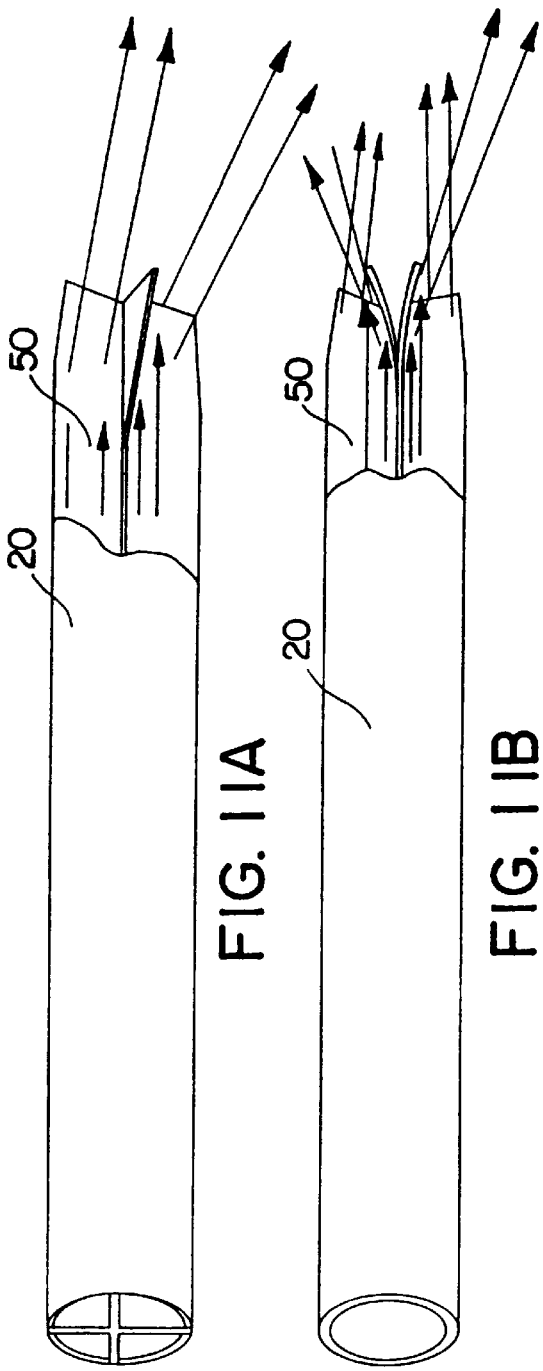

METHOD AND APPARATUS OF CONTROLLING BEAM DIVERGENCE AND DIRECTIONALITY

FIELD OF THE INVENTION

The present invention relates generally to lighting systems and, more particularly, to a method and apparatus which is capable of effectively controlling the divergence and directionality of a beam emanating from a light source.

BACKGROUND OF THE INVENTION

A significant class of illumination means are identified as a type of system used for directing beams of light from a recessed, surface mounted or suspended ceiling into a room. Many of these commonly used systems have operating disadvantages sought to be overcome by the present invention.

Common forms of light projection incorporate conventional incandescent recessed light fixtures having a substantially cylindrical form, opening into the plane of a ceiling. A bulb is recessed therein. A conventional spotlight bulb or spot lamp may be placed in the fixture as the projection source. Spot lamps are extremely inefficient using only about 25% of the energy directed into the beam. Much of the radiation produced by the source is lost within the fixture and require baffles designed to reduce peripheral glare. The radiation that does get directed out of the fixture is generally directed with a relatively narrow angular pattern. Other types of fixtures such as track systems also use inefficient spot lamps.

Some of the problems associated with the above fixtures have been overcome by the inventor's prior patent, U.S. Pat. No. 5,130,908 entitled Architectural Member Comprising Illumination System. Although this system has solved a number of problems associated with past concerns, recent energy codes do not permit the use of multiple spot floodlighting systems. Consequently, it would be highly desirable to provide a lighting system which is capable of providing extremely efficient accent light with savings in energy and bulb replacement costs while still meeting all new energy code requirements.

It is therefore an object of this invention to provide an apparatus which is capable of controlling the divergence and directionality of light beams.

It is a further object of this invention to provide a lighting system which incorporates therein a light-conveying structure terminating in a distribution system which is effective in the control of beam divergence and directionality.

It is an even further object of this invention to provide a method of controlling the divergence and directionality of a light beam.

SUMMARY OF THE INVENTION

The present invention overcomes problems associated with past lighting systems.

More specifically, the lighting system of this invention includes therein any suitable light source adjacent one end of a light conveying mechanism and a light distribution component at the other end of the conveying mechanism. The light emanating from the light source is directed through the conveying mechanism to the distribution component for output therefrom.

The uniquely designed system of this invention includes the light distribution component made up of a reflective element rotatable within a housing and a lens located within the conveying mechanism. Selective interaction between the above elements provides control over the divergence and directionality of the beam output from the system.

For a better understanding of the present invention, together with other and further objects, references is made to the following description taken in conjunction with the accompanying drawings, and its scope will be pointed out in the appended claims.

BRIEF DESCRIPTION OF THE DRAWINGS

FIG. 1 is a pictorial representation of the lighting system of this invention incorporated within a ceiling structure;

FIG. 2 is a schematic representation of the lighting system of the present invention illustrating the major components thereof;

FIG. 3 is a schematic representation of a portion of the lighting system of the present invention illustrating beam divergence in one mode of operation of the present invention;

FIG. 4 is a schematic representation of a portion of the lighting system of the present invention illustrating beam divergence in another mode of the present invention;

FIG. 5 is a schematic representation of a portion of the present invention illustrating an embodiment of this invention utilizing a unique reflective/divergence controlling element in one mode of operation;

FIG. 6 is a schematic representation of a portion of the lighting system of this invention as illustrated in FIG. 5 of the drawings in which the reflective/divergence controlling element has been rotated 180 degrees.

FIG. 10A is a schematic representation of the lighting system of this invention illustrating a beam-conveying mechanism of a particular configuration;

FIG. 10B is a schematic representation of the lighting system of this invention illustrating a beam-conveying mechanism of another configuration;

FIGS. 11A and 11B are pictorial, schematic representations of another embodiment of the present invention illustrating the utilization of reflective leaves within the beam-conveying mechanism;

DETAILED DESCRIPTION OF THE PREFERRED EMBODIMENTS

Figure 7:
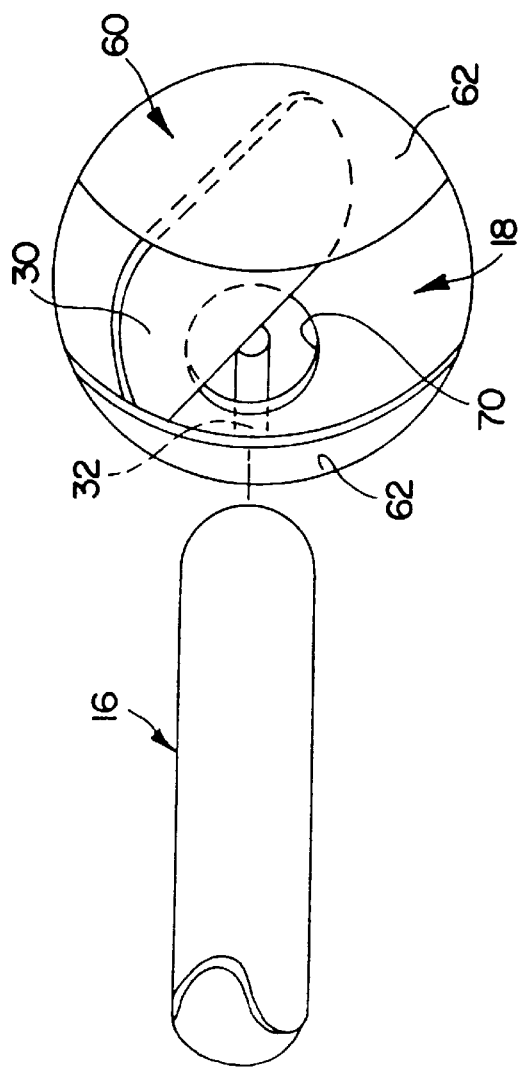
FIG. 7 is a pictorial representation of a portion of the lighting system of the present invention illustrating the beam-conveying mechanism in exploded fashion with respect to the beam distribution system of this invention.

Reference is now made to FIG. 1 of the drawings which illustrates in pictorial fashion an example of the lighting system 10 of the present invention located within panels 12 within, for example, the ceiling of an architectural structure. It should be recognized that the limitation of placing the lighting system 10 within panels or within the ceiling of a building is not a requirement, and this lighting system 10 can be integrated within the ceiling panels 12 as shown in FIG. 1 of the drawings, formed as a completely stand-alone unit, suspended independently, integrated within the structural framework of the other components of the system or formed part of an already existing lighting system. In the situation when the lighting system 10 is incorporated within panels, each of the panels 12 can be made up of a suitable material capable of being installed in any architectural surface, commonly, this surface will be a ceiling. Suitable materials can include sheet metal, Lexan polycarbonate resin, fiberous ceiling tiles or any other suitable opaque panel material, all of which may be moldable. The panel 12 may be flat over the portions which do not require the presence of other structures. Flat as used above is defined in the qualitative sense to denote a panel 12 that will fit into any architectural surface. Of course, the surface will have a thickness, and flatness in the sense of an optical flat is generally unnecessary. The panels 12 may be square or made of any other suitable shape so as to fit appropriately within an architectural surface.

Although the present invention generally is in the form of a complete lighting system 10 as shown in FIG. 1 of the drawings, it should also be recognized that lighting system 10 incorporates therein a series of uniquely designed components, each of which can be interrelated with other components to define a separate lighting system capable of therefore effectively controlling the divergence and directionality of a light beam. It should be further realized that although the terms light and light beam are used repeatedly in the description below, these terms are used generically and denote any beam of electromagnetic radiation which emanates from any suitable electromagnetic radiation source capable of providing visible light or infrared light as well. Consequently, the term light beam used in the description and claims of this invention refers to any type of beam of electromagnetic radiation.

Reference is now made to FIG. 2 of the drawings which illustrates in schematic fashion the major components of the lighting system 10 of the present invention. Lighting system 10 incorporates therein any suitable lighting source 14 in the form of, for example, a metal halide, high pressure sodium, infrared or halogen source located adjacent a beam-conveying mechanism 16 and a light distribution component 18. More specifically, the beam-conveying mechanism 16 is made up of an elongated tubular member 20 of suitable diametric configuration, both internal and external. The internal surface 17 of tubular member 20 is reflective in order to assist in the conveyance of a beam of light 21 emanating from source 14 along the longitudinal axis of tubular member 20. The resultant beam 21 output onto the light distribution component 18. Also located within the tubular member 20 are lenses 23 and 24 which direct the light emanating from source 14 along the longitudinal axis of tubular member 20 to distribution component 18. For example, lens 23 may be an extremely low F number lens such as an aspheric lens while lens 24 may be a long focal bi-convex or double convex lens having a focal point ranging from approximately 100 mm to 600 mm.

Lens 24 is positioned within tubular member 20 such that the distance D between the source 14 and the lens 24, in most circumstances equals the focal length of the lens 24. This type of placement of lens 24 results in the divergent angle θ producing a divergent angle theta at the output at the distribution component 18 equal thereto. In addition, the mounting arrangement for lens 24 may be designed for longitudinal movement of lens 24 such that the position of lens 24 with respect to source 14 may be moved in the longitudinal direction such as to alter the divergence of the output beam. Also, as shown in FIG. 2 of the drawings, the lighting system 10 is placed within a series of panels 12 having openings 25 located adjacent lighting source 14 and distribution component 18, respectively. The opening 25 adjacent source 14 is optional and may be used as an additional illumination source.

Reference is now made to FIGS. 3 and 4 of the drawings which more clearly illustrate the elements of the light distribution component 18. Preferably light distribution component 18 is made of a spherical configured globe-like element 19, preferably transparent or translucent and made of clear or colored plastic or glass depicted pictorially in FIG. 7 of the drawings. Portions of the inner or outer surface of outer surface of element 19 contains a series of patterns 28 therein such as illustrated in FIG. 3 and in FIG. 4. These patterns 28 can be made up of a plurality of concave or convex surfaces positioned such that upon the rotation of the globe-like element 19 about an axis L lying along the longitudinal axis of tubular member 20 the output beam selectively passes therethrough. Rotation of element 19 about axis L is illustrated in FIGS. 3 and 4 of the drawings. The patterned portion 28 of element 19 is shown in on the top in FIG. 3 and on the bottom in FIG. 4. By selectively rotating element 19, the divergence of the output beam can also be controlled by the surface configuration of element 19 as shown in FIG. 4.

Also located within the distribution component 18 embodied by the spherical element 19 is a rotatable reflecting element 30. Reflecting element 30 directs the beam from the conveying mechanism 16 out of the globe-like element 19. This reflecting element 30 is rotatably secured within the globe-like element 19 by a pair of support rods 32, one of which being shown in FIG. 7 of the drawings. Alternate means for securing and moving the reflective element 30 in relation to the globe-like element 19 or the surrounding environment may be by the utilization of a gimbal mount or magnetic interconnection through the surface of element 19. The axis of rotation of reflecting element 30 is perpendicular to the axis of rotation L of the globe-like element 19 and is designated in FIG. 3 and 4 of the drawings as axis A.

Reference is now made to FIGS. 5 and 6 of the drawings which illustrates that the reflecting element 30 may also have a patterned surface 40. As shown in FIG. 5, reflective element 30 is positioned such that the patterned surface 40 receives the outcoming beam of light from the conveying mechanism 16. In FIG. 6 of the drawings, the reflective element 30 has been rotated 180 degrees such that the patterned surface 40 is on the top and the light beam emanating from conveying mechanism 16 strikes a flattened reflective surface of 42. Selective rotation of the reflective element within globe-like element 19 also affects the divergence of the output beam.

Rotation of the spherical element 19 about the longitudinal axis L as shown in FIGS. 3 and 4 not only rotates the spherical component 26 about axis L, but also element 30 located therein. In addition, the reflective element 30 is independently rotatable about axis A as clearly illustrated in FIG. 5 and 6 of the drawings. It should be further recognized, although not shown in the drawings, that the reflective element 30 may also be mounted within element 19 in such a manner that it may be independently rotatable with respect to globe-like element 19 and not necessarily rotatable therewith.

Reference is once again to the FIGS. 2 through 6 for an explanation of the method of controlling both the directionality and divergence of the output beam. More specifically, lens 24 is situated within the tubular member 20 in such a position that the distance between the source 14 and lens 24 is equal to the focal length of lens 24. This arrangement creates a repetitive pattern of focus and divergence along the conveying mechanism 16 until the light beam strikes the reflective element 30 and is directed out of the distribution component 18 at a preselected angle of divergence. By altering the longitudinal position of lens 24 within conveying mechanism 16, the angle of divergence of the output beam can be altered accordingly. Changing the type of lens 24 will have an affect on the divergent output angle of the beam being output from the distribution component 18. Although this is one way of changing the divergence of the output angle from distribution component 18, there are other ways in which the divergence is controlled by the lighting system of the present invention. For example, controlling the divergence of the output angle theta can be effected by the rotation of the globe-like element 19 about axis L as illustrated in FIGS. 3 and 4 of the drawings. This rotation alters the position of the surface pattern 28 relative to the incoming beam and affects the divergence of the beam output therefrom. Another method of controlling the divergence angle θ output from distribution component 18 is by rotating reflective element 30 within element 19 about axis A until another surface of reflective element 30 is aligned with the beam. This rotation is illustrated in FIGS. 5 and 6 of the drawings alters the pattern which receives the light from the conveying mechanism 16 and subsequently effects divergence. Alternatively, reflective element 30 could be rotated about an axis perpendicular thereto in a gimbal arrangement (not shown) in order to alter the pattern which receives the light from the conveying mechanism. Additionally, controlled rotation of reflective element 30 also controls the directionality of the output beam in accordance with the angle of the reflective element 30 relative to the incoming beam of light.

It is, therefore, abundantly clear that the present invention has incorporated therein a series of unique movable and rotational components which can effectively control the divergent output angle of a beam of light emanating at a source 14 directed to a remote location at which a distribution component 18 directs the light therefrom. Such a system is a highly effective way of controlling output divergence without the necessity of replacing the light source or lenses. Furthermore, the angle of divergence and directionality can be easily reproduced.

Figure 9:
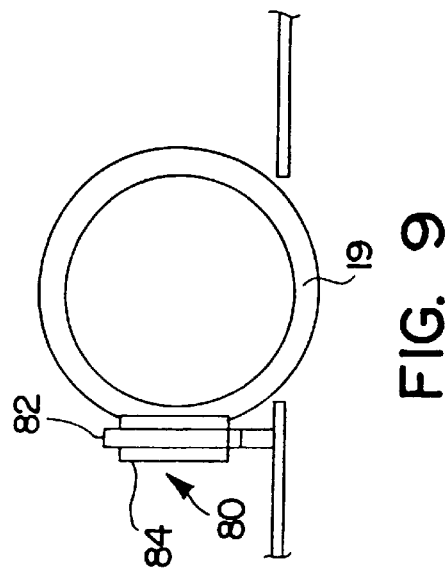
FIG. 9 is a side view of the beam distributing means illustrating both the mechanism for movement of the distributing means as well as its interconnection to a beam-conveying mechanism.
Figure 8:
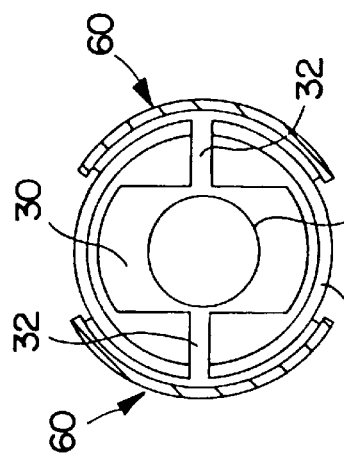
FIG. 8 is a front view illustrating the beam distribution means and incorporating the mechanism utilized for movement thereof.

Reference is now made to FIG. 7 through 9 of the drawings which clearly depict the control mechanism 60 which is incorporated within the light distribution component 18 and is utilized to control the rotation of the globe-like element 19 and reflective element 30 contained therein. A pair of control rods 32 are affixed at one end thereof to the reflective element 30 to permit the controlled rotation of reflective element 30 with respect to globe-like element 19. The other end of each of the rods are affixed to a control mechanism 60 which is made up of a pair of partial spherical components 62 sized in diameter slightly greater than the diameter of the spherical globe-like element 19. Components 62 may be made of any suitable material such as plastic or light weight metal and although it can be transparent, it is preferably made of an opaque material. This permits for an aesthetically pleasing design which enables movement of the components of the present invention and yet permits the output of light from the distribution means to be effective. Therefore, movement of control mechanism 60, without rotation thereof with respect to globe-like element 19 can rotate element 19 about axis L while rotation of mechanism 60 with respect to globe-like element 19 rotates reflective element 30 about axis A.

Distribution component 18 is rotatably attached to the conveying mechanism as illustrated in FIGS. 7 and 9. Distribution component 18 has a preferably circular opening 70 located within the spherical globe-like element 19 as shown in FIG. 7 of the drawings. A seal and locking mechanism permit the rotation of element 19 about the longitudinal axis L of tubular member 20 yet prevents its movement in the longitudinal direction along axis L. In addition the seal is utilized to prevent dust and other contaminants from entering the globe-like element 19. As an alternative to the above-described embodiment that is shown in FIG. 7 a yoke and collar arrangement 80 as shown in FIG. 9 of the drawings can be utilized with the present invention to secure the distribution means 18 to the tubular member 20. In such an embodiment of the invention rotation takes place within yoke 82 by collar 84 which is fixedly secured to globe-like element 19 and is rotatably secured to the conveying mechanism 20. The yoke 82 prevents any longitudinal movement of the light distribution component relative to the conveying mechanism 20.

FIGS. 10A and 10B illustrate an alternate embodiment of the present invention in which the conveying means 16 is produced by a series of tubular members 20 of varying internal diameter. The internal diameter of the tubular member 20 effects the bounces of the beam off the reflective surfaces thereof and can therefore be optimally designed to increase the efficiency of the system. This efficiency is determined by matching the diameter to the distance of light conveyance. FIG. 11A and 11B illustrate the utilization of reflective leaves 50 located within the tubular member 20 such that there movement or twisting of these leaves 50 can have an affect on the eventual divergence of light being output from the system.

Figure 12:
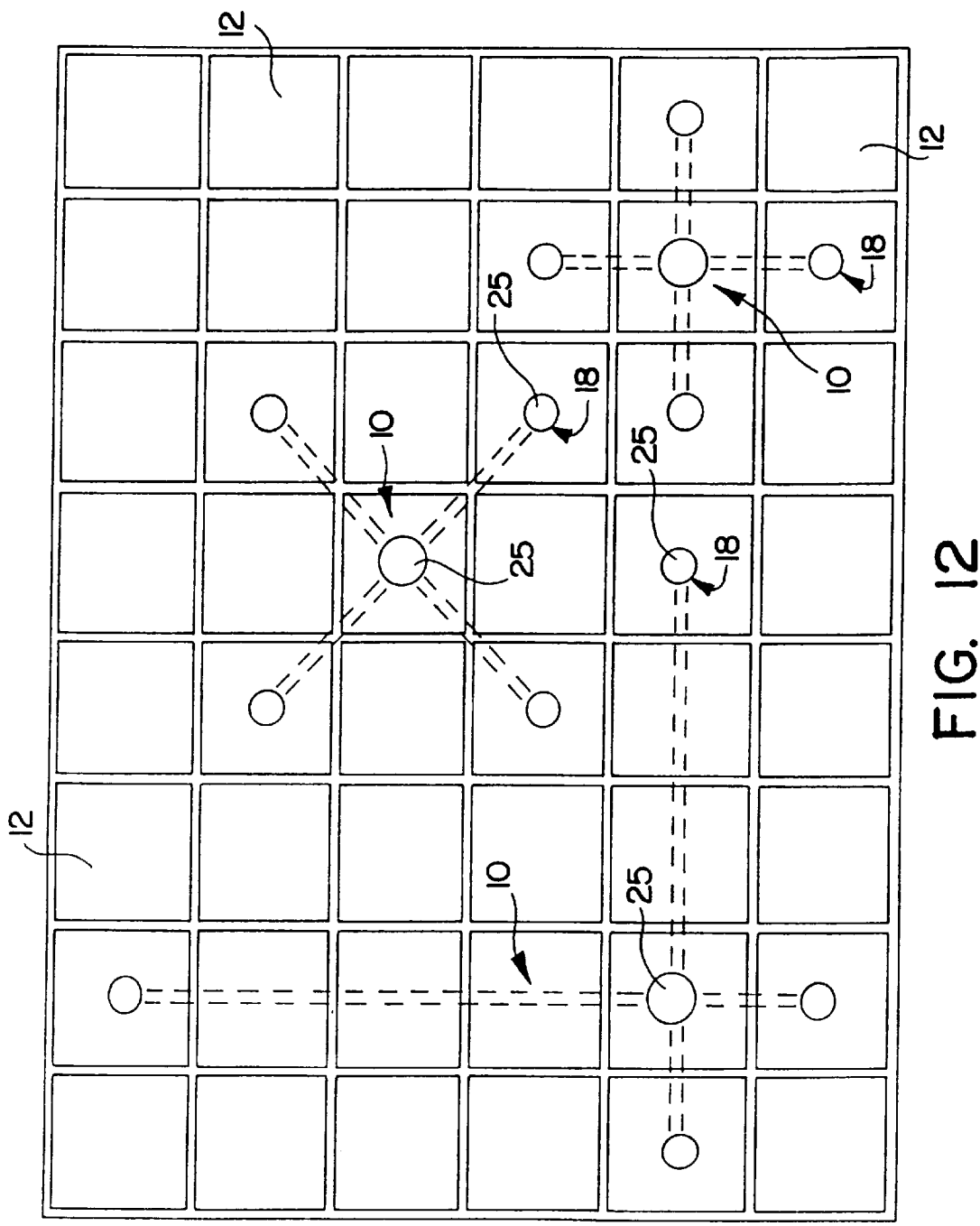
FIG. 12 is a plan view of a ceiling illustrating various configurations of the lighting system of the present invention incorporated therein.

FIG. 12 of the drawings clearly illustrate a plurality of light distribution systems 10 of the present invention located in a variety of different positions, sizes and configurations within the ceiling of an architectural structure. As illustrated therein, each of the lighting systems 10 have different lengths and configurations with the distribution components 18 being situated at remote locations. In the configurations illustrated in FIG. 12 of the drawings, openings 25 are also provided adjacent to light sources 14 such that the output of light from the lighting system 10 includes stray light emanating from the sources 14. It should be recognized that the openings 25 located adjacent sources 14 are not required but are an option available within the present invention.

Although the present invention has been described with particular embodiments, it will be understood that this invention is also capable of further and other embodiments within the spirit and scope of the appended claims. For example, the conveying mechanism can also provide tubular light distribution along its length, if so desired.

What is claimed is:

1. An apparatus for controlling the divergence and directionality of a beam of electromagnetic radiation, said apparatus comprising:

a housing;

means within said housing for receiving a beam of electromagnetic radiation and directing said beam with at least one preselected divergence through said housing to a plurality of different locations, and permitting rotation of the housing in one direction without rotation of the housing in another direction; and said housing at least partially surrounding said receiving and directing means and being in cooperative engagement therewith.

2. An apparatus as defined in claim 1 wherein said receiving and directing means includes means for controlling the divergence of said beam directed therefrom.

3. An apparatus as defined in claim 2 wherein said housing includes means for controlling the divergence of said directed beam.

4. An apparatus as defined in claim 1 further comprising means for rotatably securing said receiving and directing means within said housing.

5. An apparatus as defined in claim 4 wherein said receiving and directing means comprises a reflective element having two sides, one of said sides having a preselected reflective pattern thereon, said preselected reflective pattern providing a different divergence to said directed beam than the other side of said reflective element.

6. An apparatus for controlling the divergence and directionality of a beam of electromagnetic radiation, said apparatus comprising:

a housing;

means within said housing for receiving a beam of electromagnetic radiation and directing said beam with at least one preselected divergence through said housing to a plurality of different locations; and said housing at least partially surrounding said receiving and directing means and being in cooperative engagement therewith;

means for rotatably securing said receiving and directing means within said housing;

said housing having at least one preselected pattern thereon for controlling the divergence of said directed beam directed through said housing.

7. An apparatus for controlling the divergence and directionality of a beam of electromagnetic radiation, said apparatus comprising:

a housing;

means within said housing for receiving a beam of electromagnetic radiation and directing said beam with at least one preselected divergence through said housing to a plurality of different locations;

said housing at least partially surrounding said receiving and directing means and being in cooperative engagement therewith; and means for rotatable securing said receiving and directing means within said housing;

said receiving and directing means comprises a reflective element having two sides, one of said sides having a preselected reflective pattern thereon, said preselected reflective pattern providing a different divergence to said directed beam than the other side of said reflective element;

said housing having at least one preselected pattern thereon for controlling the divergence of said directed beam directed through said housing.

8. An apparatus as defined in claim 5 wherein said beam of electromagnetic radiation is a visible beam of light.

9. A system for controlling the divergence and directionality of a beam of electromagnetic radiation, said system comprising:

a source of electromagnetic radiation for producing said beam;

means for conveying said beam in a preselected direction, said source of electromagnetic radiation being positioned proximate one end of said conveying means;

means operably connected to the other end of said conveying means for distributing said beam therefrom, wherein said beam distributing means includes rotatable means for receiving said beam from said conveying means and directing said beam with at least one preselected divergence to a plurality of different locations, said receiving and directing means including a reflective element; and second rotatable means within said conveying means for controlling the divergence of said directed beam.

10. A system as defined in claim 9 wherein said distributing means further comprises a housing, said housing at least partially surrounding said receiving and directing means, said receiving and directing means being a reflective element having two sides, one of said sides having a preselected reflective pattern thereon, said preselected reflective pattern providing a different divergence to said directed beam than the other side of said reflective element.

11. A system for controlling the divergence and directionality of a beam of electromagnetic radiation, said system comprising:

a source of electromagnetic radiation for producing said beam;

means for conveying said beam in a preselected direction, said source of electromagnetic radiation being positioned proximate one end of said conveying means;

means operably connected to the other end of said conveying means for distributing said beam therefrom, wherein said beam distributing means includes means for receiving said beam from said conveying means and directing said beam with at least one preselected divergence to a plurality of different locations, said receiving and directing means including a reflective element; and means within said conveying means for controlling the divergence of said directed beam;

said distributing means further including a housing, said reflective element being rotatably mounted within said housing and directing said beam through said housing, said housing having at least one preselected pattern thereon for controlling the divergence of said directed beam directed through said housing.

12. A system as defined in claim 9 wherein said receiving and directing means being a reflective element having two sides, one of said sides having a preselected reflective pattern thereon, said preselected reflective pattern providing a different divergence to said directed beam than the other side of said reflective element.

13. A system as defined in claim 12 further comprising a housing rotatably secured to said conveying means about the longitudinal axis of said conveying means and said reflective element being rotatably secured to said housing about an axis perpendicular to said longitudinal axis.

14. A system as defined in claim 13 wherein said means within said conveying means for controlling the divergence of said directed beam comprises a lens with a preselected focal point.

15. A system as defined in claim 14 wherein said distributing means further comprises means for means for effecting the rotation of said reflective element and said housing.

16. A system as defined in claim 15 wherein said housing is of a predetermined substantially spherical configuration and said rotation effecting means partially surrounds said housing is operably connected to said reflective element and is slightly larger than said housing.

17. A system as defined in claim 16 wherein said conveying means is of a tubular configuration having a reflective interior, said housing having an opening therein for receiving said conveying means therein.

18. A system as defined in claim 16 wherein said conveying means is of a tubular configuration having a reflective interior, said housing having an opening therein and means interposed between said conveying means and said opening in said housing for receiving said conveying means and permitting said housing to rotate with respect thereto.

19. A system as defined in claim 16 wherein said system is combined at least partially within a ceiling panel.

20. A method for controlling the divergence and directionality of a beam of electromagnetic radiation, said method comprising the steps of:

directing said beam along a preselected path, receiving said beam proximate the end of said preselected path and outputting said beam to at least one location;

controlling the divergence of said output beam by a first rotatable means positioned along said preselected path;

controlling the direction of said output beam by a second rotatable means; and controlling the divergence of the output beam by a preselective combination of said first means and a third means associated therewith.

* * * * *